INVENTOR

Béla Barényi

April 18, 1961  B. BARÉNYI  2,980,466
LOAD-CARRYING COMPARTMENT FOR PASSENGER CARS
Original Filed Feb. 18, 1952  2 Sheets-Sheet 2
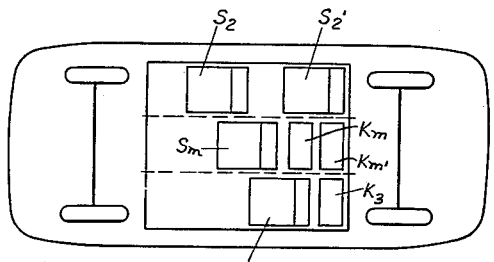
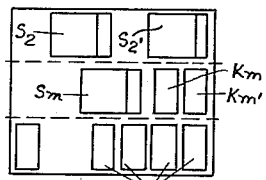
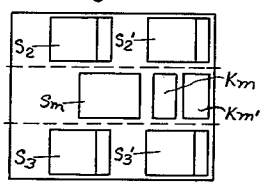
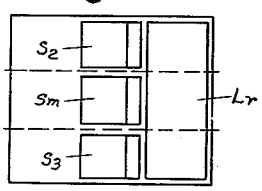
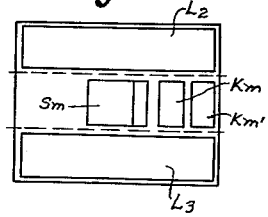
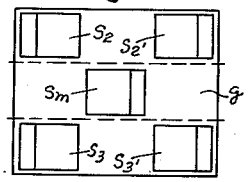
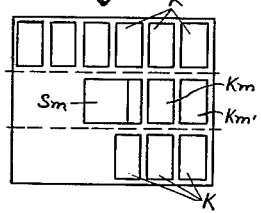
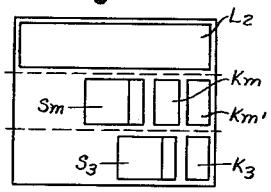
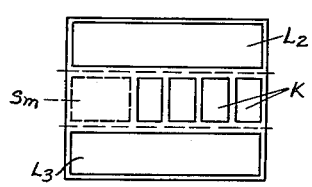
INVENTOR
Béla Barényi
By Dicke and Padlon
ATTORNEYS United States Patent Office 2,980,466
Patented Apr. 18, 1961

2,980,466

LOAD-CARRYING COMPARTMENT FOR PASSENGER CARS

Béla Barényi, Stuttgart-Rohr, Germany, assignor to Daimler-Benz Aktiengesellschaft, Stuttgart, Unterturkheim, Germany Original application Feb. 18, 1952, Ser. No. 272,075. Divided and this application Mar. 27, 1956, Ser. No. 577,431

Claims priority, application Germany Feb. 21, 1951

1 Claim. (Cl. 296—24)

The invention relates to automotive passenger cars. The object of the invention is a novel design for passenger cars which can be used for different purposes and which are easily and quickly convertible to a variety of uses.

Another object of the invention is a passenger car in which the space available for passengers and baggage is efficiently utilized and in which the load is favourably distributed with respect to the springs.

The object of the invention is attained by providing a substantially rectangular load carrying floor surface, which is disposed substantially symmetrically with respect to the front and rear axles, the distance between the front edge of said floor surface and the front axle being substantially equal to the distance between the rear edge of said surface and the rear axle. The front and the rear walls of the load carrying compartment above said floor are inclined outwardly from said front or rear edge towards the front or rear of the vehicle, the angle of inclination being preferably equal for said front and said rear wall.

According to another feature of the invention the width of the seats, trunks, litters or other objects mounted or stored on the load carrying floor is so dimensioned as to be substantially equal to one half or one third of the width of said floor so that either two or three of said objects will occupy the entire width of the floor with only as little clearance as possible between adjacent objects or between the objects and the body side panels.

Further objects of the invention will become apparent from a consideration of the following specification and the accompanying drawings showing several embodiments of the invention. Of the drawings Fig. 1 is a schematic side view of a passenger car embodying the features of the invention.

Fig. 3 is a schematic plan view of a passenger car showing another way of arranging seats and other objects on the load carrying floor of the vehicle.

Figs. 4 to 11 are plan views of load carrying floor surfaces of passenger cars, showing various further ways of arranging the seats and other objects on the floor surface.

Figure 1:
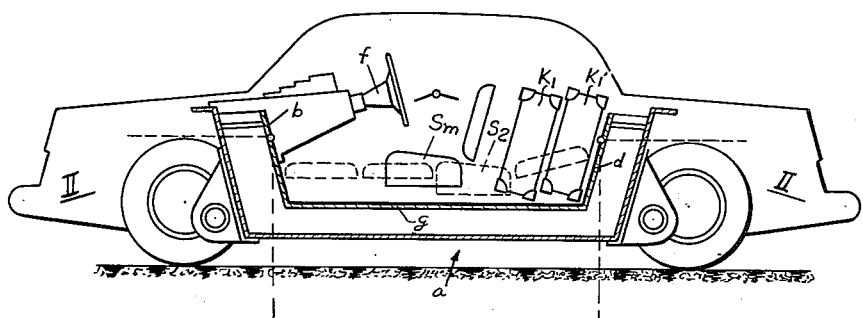
Figure 2:
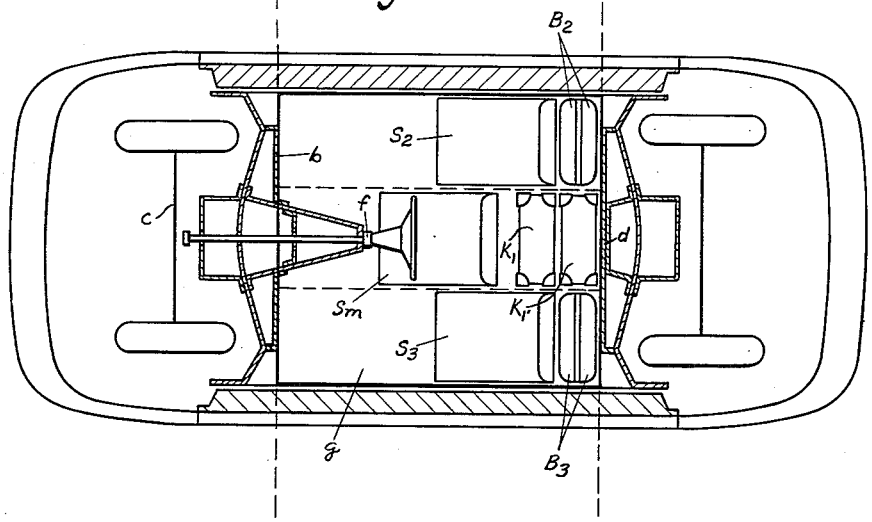
Fig. 2 is a schematic plan view of the vehicle shown in Fig. 1.

The vehicle shown in Figs. 1 and 2 includes a U-shaped frame member $a$, supported in a suitable way by the car wheels, the forward leg $b$ of the U shaped frame member being disposed close to the front axle $c$ and the rearward leg $d$ close to the rear axle $e$. The steering gear assembly $f$ is disposed in the longitudinal center plane of the vehicle. A substantially rectangular level load carrying floor $g$ is provided within the U shaped trough formed by the frame member $a$, said floor being disposed substantially symmetrically between the front and the rear axles. The legs $b$ and $d$ of the frame member $a$, which include front and rear upturned ends of the floor, are inclined outwardly towards the front and rear, the angle of inclination being equal for both legs.

In the embodiment shown in Figs. 1 and 2 a driver's seat $S_m$ is disposed behind the steering wheel substantially in the center of the passenger compartment. Two further seats $S_2$ and $S_3$ are disposed on the left and right sides of the car somewhat to the rear of the driver's seat, there being sufficient room back of each of these seats for a trunk, a folding seat or similar object designated by the reference letters $B_2$, $B_3$. The comparatively large space behind the driver's seat can be instance be utilized for storing two additional trunks $K_1$, $K_1'$. After removal of the objects $B_2$ and $B_3$ the backs of the seats $S_2$ and $S_3$ can be tilted back to convert these seats into beds without having to shift the position of these seats on the floor for this purpose (see Fig. 1). The term bed as used in this specification pertains to any contrivance allowing a person to rest in a reclined position, as for instance a couch, a litter or the like. The driver's seat may be arranged somewhat higher than the seats $S_2$ and $S_3$. An obvious advantage flows from this relatively higher position; i.e., the driver has a better view of the road both in front of and at the sides of the vehicle than would be afforded by a seat at the level of the other seats and in this position he is nearer to the steering wheel. For the purpose of converting these seats into beds, it is advantageous to dispose them, at a comparatively low level adjacent the floor of the car, but such a level is unsuitable for the driver's seat. The above described arrangement of the seats and other objects results in a particularly efficient utilization of the rectangular floor space if the width of these objects is so dimensioned as to be substantially equal to one half or one third of the width of the floor so that either two or three of said objects placed one beside the other will just occupy the width of the rectangular floor surface, the side clearance between adjacent objects and between the objects and the side body panels being kept as small as possible. The trunks will preferably be so dimensioned— with the trunk disposed flat on the floor—that the height of the trunk is equal to one half of the trunk width and the length of the trunk equal to one half of the width of the floor surface. In all the embodiments the trunks are shown standing upright on their ends.

Numerous variations of the above described arrangement are possible. A few particularly favorable arrangements will be described below with reference to Figs. 3 to 11.

In the embodiments shown in Figs. 3, 4, 5, 6, 7, 9 and 10 two trunks $K_m$ and $K_m'$ are stored back of the driver's seat. In the embodiments shown in Figs. 3, 4 and 5 two additional seats $S_2$ and $S_2'$ are arranged on the right side of the car. In the embodiment shown in Fig. 3 a further seat $S_3$ is provided on the left side of the vehicle with sufficient room behind this seat to accommodate a trunk $K_3$. In Fig. 4 five or six trunks $K$ occupy one side of the compartment, whereas in Fig. 5 two further seats $S_3$ and $S_3'$ are arranged to the left of the driver's seat, all of the seats facing forward.

In the embodiment shown in Fig. 8 there are four seats $S_2$, $S_2'$, $S_3$, $S_3'$ besides the driver's seat, one in each corner of the floor $g$, these four seats being so arranged that their occupants face each other.

In the embodiment shown in Fig. 9 the available floor space to the side and to the rear of the driver's seat is taken up by trunks or other containers.

In the embodiment shown in Fig. 6 additional seats $S_2$, $S_3$ are provided, one on each side of the driver's seat, the space behind the three seats being occupied by a bed $L_r$ disposed transversely to the car.

In the embodiments shown in Figs. 7 and 11 beds or litters $L_2$ and $L_3$ are arranged on each side of the driver's seat. The only difference between the arrangements shown in these two figures is that in Fig. 11 the driver's seat is disposed farther towards the front than in Fig. 7, so that two additional trunks can be stored behind the driver's seat.

The embodiment shown in Fig. 10 shows a bed $L_2$ disposed on the one side and a seat $S_3$ with a trunk $K_3$ stored behind it disposed on the other side of the driver's seat.

Many arrangements different from those described are obviously possible. In the embodiments showing beds these beds could for instance be replaced by convertible seats, litters or by a plurality of trunks or containers of a corresponding size.

The rectangular shaped load carrying floor can be designed as a separate frame member. It can also be fastened to a frame member especially designed for this purpose or can be an integral part of a unitary body and frame structure. In the embodiment shown in Figs. 1 and 2 the load carrying floor member is part of the center section of a vehicle composed of three separate sections.

This application is a division of abandoned application Ser. No. 272,075, filed on February 18, 1952, by Bela Barenyi, entitled "Passenger Car."

What I claim is:

A passenger car having a substantially flat rectangular load-bearing floor having front and rear upturned ends, the steering wheel and the driver's seat being arranged substantially symmetrical to the central longitudinal plane of the car, two additional seats disposed at a level adjacent said floor and respectively arranged to the left and to the right of the driver's seat, the widths of said driver's seat and said additional seat being substantially equal to one-third the width of said floor, said driver's seat being disposed at a higher level than that of said additional seats to afford the driver an advantageous position for operating said car, said driver's seat being disposed at substantially equal distances from said front and rear upturned ends, said additional seats comprising bottoms and backs, the rearward parts of said bottoms and the said rear upturned end defining the forward and rear limits of spaces less than the space between said driver's seat and said rear upturned end, said backs of said seats being rearwordly turnable to substantially horizontal positions, the positions of said bottoms being fixed, means for forming beds in said car, said means comprising said backs when turned to said substantially horizontal positions and further comprising said bottoms in said fixed positions, said backs when turned to said substantially horizontal positions being closely adjacent said rear upturned end and occupying at least a portion of said spaces, said backs constituting one end of each of said beds.

References Cited in the file of this patent

UNITED STATES PATENTS

| | | |
|---|---|---|
| 1,078,602 | Morgan | Nov. 11, 1913 |
| 1,163,056 | Zimmerman | Dec. 7, 1915 |
| 1,498,874 | Hopkins | June 24, 1924 |
| 1,556,778 | Forostovsky | Oct. 13, 1925 |
| 1,658,110 | Warren | Feb. 7, 1928 |
| 2,128,930 | Fageol et al. | Sept. 6, 1938 |
| 2,190,218 | Paton | Feb. 13, 1940 |
| 2,261,693 | Mathauer | Nov. 4, 1941 |
| 2,638,374 | Willson | May 12, 1953 |
| 2,647,791 | Barenyi | Aug. 4, 1953 |
| 2,662,793 | Lindsay | Dec. 15, 1953 |
| 2,751,247 | Barenyi | June 19, 1956 |

FOREIGN PATENTS

| | | |
|---|---|---|
| 774,951 | France | Oct. 1, 1934 |
| 940,185 | France | May 10, 1948 |
| 476,100 | Great Britain | Dec. 1, 1937 |
| 321,242 | Italy | Sept. 28, 1934 |
| 333,734 | Italy | Jan. 10, 1936 |
| 45,926 | Netherlands | June 15, 1939 |